US008525981B2

(12) United States Patent
Chen et al.

(10) Patent No.: US 8,525,981 B2
(45) Date of Patent: Sep. 3, 2013

(54) RETURN LOSS MEASUREMENT SYSTEM (75) Inventors: David Zhi Chen, Richardson, TX (US); Vijay Jain, West Friendship, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 653 days.

(21) Appl. No.: 12/748,742

(22) Filed: Mar. 29, 2010

(65) Prior Publication Data
US 2011/0235023 A1 Sep. 29, 2011

(51) Int. Cl.
G01N 21/00 (2006.01)

(52) U.S. Cl.
USPC ........................................................ 356/73.1

(58) Field of Classification Search
None
See application file for complete search history.

(56) References Cited

U.S. PATENT DOCUMENTS

| | | | |
|---|---|---|---|
| 3,753,086 A * | 8/1973 | Shoemaker, Jr. ............. | 324/533 |
| 4,927,266 A * | 5/1990 | Sugiura et al. ............. | 356/243.1 |
| 6,459,478 B1 * | 10/2002 | Schmidt et al. .............. | 356/73.1 |
| 6,580,498 B1 * | 6/2003 | Harley .......................... | 356/73.1 |
| 6,590,642 B2 * | 7/2003 | Iida .............................. | 356/73.1 |
| 6,788,396 B2 * | 9/2004 | Stolte et al. .................. | 356/73.1 |
| 6,879,387 B2 * | 4/2005 | Paduch ......................... | 356/73.1 |
| 7,061,669 B2 * | 6/2006 | Nakashima et al. ...... | 359/341.41 |
| 7,271,575 B2 * | 9/2007 | Pickerd et al. ............. | 324/76.19 |
| 7,561,798 B2 * | 7/2009 | Kokkinos ........................ | 398/31 |
| 7,769,292 B2 * | 8/2010 | Sylvester et al. ............... | 398/45 |
| 8,314,926 B2 * | 11/2012 | Motter et al. ................. | 356/73.1 |
| 2005/0174563 A1 * | 8/2005 | Evans et al. .................. | 356/73.1 |
| 2008/0144015 A1 * | 6/2008 | Goto et al. ................... | 356/73.1 |

* cited by examiner

Primary Examiner — Gordon Stock, Jr.

(57) ABSTRACT

A method may include injecting a test signal having a first optical launch power into a device under test via an optical splitter. The optical splitter includes at least two upstream ports and a downstream port and the test signal is injected in a first upstream port of the optical splitter. The device under test is coupled to the downstream port. Return loss associated with the device under test is measured at a second upstream input of the optical splitter. The RL measurement in stored a database. The injecting, measuring, and storing are repeated for a number of different optical launch powers.

20 Claims, 5 Drawing Sheets

RETURN LOSS MEASUREMENT SYSTEM

BACKGROUND INFORMATION

Optical data networks are increasingly being used for a variety of implementations, such as Ultra Long Haul (ULH) networks, Metro networks, and local access networks (e.g., Verizon FiOS™). With these increased uses, it is becoming increasingly important to ensure that provisioned equipment meets the requirements and expectations for each particular use. More specifically, optical components may introduce losses into a network, such as insertion losses (IL) as well as return losses (RL).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to accurately testing and/or modeling total return loss (RL) in an optical device under test, such as a connector, a fiber span, etc. The phrase "return loss" or "RL" refers to the power of a reflected optical signal within an optical system or device, such as an optical fiber. For example, an optical signal having a certain power may be inserted into the optical system. The RL is a measure of the power of the portion of the optical signal that is reflected back through the system relative to the power of the inserted signal.

In one exemplary implementation, a tuned source signal may be injected into an RL modeling system. The RL modeling system may include a passive optical splitter upstream of the device or system under test (DUT). For example, in a 50-50 2×2 optical splitter (e.g., two inputs and two outputs), one half of the input signal power may be directed to an optical launch power monitor, with the remaining one half of the signal power being directed to the DUT. The optical launch power monitor may be configured to measure and control a tunable signal generator, such as a tunable laser, so that a specific optical launch power can be inserted into the DUT.

The portion of the optical signal that is reflected back by the DUT passes back through the optical splitter and is measured by a back reflection receiver to produce a RL value for the DUT at the specified launch power. Consistent with implementations described herein, signals having a number of different launch powers and/or wavelengths may be provided to the RL modeling system, with the RL values corresponding to each launch power being recorded in the database. A RL function or curve may be produced based on the measured data, thereby providing a very accurate model of RL characteristics for the DUT.

Figure 1:
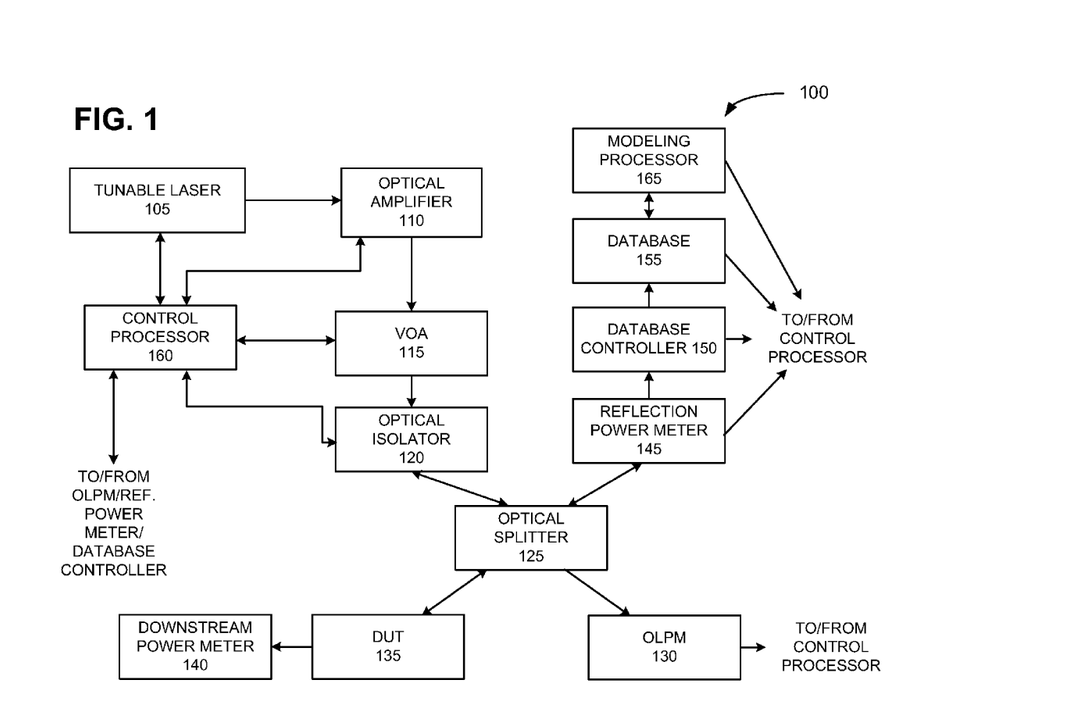
FIG. 1 illustrates an exemplary network in which systems and methods described herein may be implemented.

FIG. 1 is a block diagram of an exemplary configuration of an RL modeling system 100. As shown, RL modeling system 100 may include tunable laser 105, an optical amplifier 110, a variable optical attenuator (VOA) 115, an optical isolator 120, an optical splitter 125, a optical launch power monitor and feedback controller 130, a device under test (DUT) 135, a downstream power meter 140, a reflection power meter 145, a database controller 150, a database 155, a control processor 160, and a modeling processor 165.

The configuration illustrated in FIG. 1 is provided for simplicity. In other implementations, more, fewer, or different arrangement of components may be included in RL modeling system 100. For example, one or more display devices or user interfaces may be included in measuring system 100 to allow a network engineer (or other party) to initiate or control a test of DUT 135. In addition, one or more power supplies, or other components may be included in RL modeling system 100 to facilitate testing.

Tunable laser 105 may include an erbium doped fiber light source (i.e., laser) that emits a broadband spectrum in the C-band (i.e., wavelengths between 1530 and 1565 nanometers) and/or L band (i.e., wavelengths between 1565 and 1625 nanometers). Tunable laser 105 may also provide an optical signal adequate for high data rate testing, such as 100 gigabits per second (Gbps) or more. As described below, tunable laser 105 may be controllable based on input received from optical launch power monitor and feedback controller (OLPM) 130.

Tunable laser 105 may be configurable to output light at a particular wavelength. For example, in an exemplary implementation, tunable laser 105 may support a range that includes C-band and L-band wavelengths. The values associated with wavelengths emitted by tunable laser 105 listed above are exemplary only and tunable laser 105 may have other parameters based on the particular circumstances and/or optical path and/or device being tested, such as other wavelengths or optical signal properties.

As will be described in detail below, tunable laser 105 may receive a user selection of a particular wavelength via a controller or other device (not shown). For example, tunable laser may include (or may be connected to) control processor 160 configured to receive a test/measurement request from a technician. In other implementations, control processor 160 may include communication logic for receiving information/instructions from a remote device via a network, for example. Control processor 160 may initiate tuning of tunable laser 105, causing tunable laser 105 to output a test signal having defined wavelength characteristics.

Optical amplifier 110 may include an optical boost amplifier (OBA) configured to adjust (e.g., increase or decrease) the power of the test signal without optical-electric-optical conversion. In one implementation, optical amplifier 110 may operate to amplify or boost the test signal optical power by up to approximately 25 decibels (dBm). The term "dBm" refers to a logarithmic ratio of power (e.g., "dB") to 1 milliwatt (mW) of reference power and is commonly used as an absolute representation of the power of an optical signal. For example, an input laser signal having 0.1 mW of power may be represented as an optical launch power −10 dBm. As described below, optical amplifier 110 may receive input from optical launch power monitor and feedback controller 130 representative of the optical launch power measured after the input signal passes through optical splitter 125. The received input may be used to adjust the level of amplification applied to the test signal received from tunable laser 105.

VOA 115 may receive the amplified test signal from optical amplifier 110 and may attenuate the power level of the test signal in a controlled manner based on, e.g., user input or feedback from optical launch power monitor and feedback controller 130 to generate an attenuated test signal. In this manner, VOA 115 may be configured to regulate the optical power level of the test signal without modifying the driving current of tunable laser 105. In addition, VOA 115 may smooth out any irregular optical power variations. As optical power fluctuates, VOA 115 may adjust the attenuation and to maintain the optical power of the test signal at a relatively constant level. Furthermore, as described further below, VOA 115 may sweep through specific values of optical launch power, to allow RL modeling system 100 to measure values of RL at various different launch powers.

Optical isolator 120 may be provided downstream of VOA 115 and operate to allow transmission of light in only one direction, e.g., the downstream direction. Optical isolator 120 prevents return light from traveling back to VOA 115, optical amplifier 110, and tunable laser 105, thereby protecting these components from damage or interference caused by return optical signals.

Passive optical splitter 125 may include a 50-50 2×2 optical splitter having, for example, a 3 dB loss associated therewith. That is, for the test signal traveling from isolator 120 toward DUT 135, optical splitter 125 splits the optical signal (after a 3 dB loss) into two downstream outputs, with each output signal having 50% of the optical launch power of the input test signal, one directed toward DUT 135 and the other directed toward optical launch power monitor and feedback controller 130.

Similarly, as discussed below, a return signal may be received from DUT 135 and split into two upstream signals, each having 50% of the optical power of the received return signal, one directed toward optical isolator 120, and the other directed toward reflection power meter 145.

Although a 50-50 2×2 optical splitter is discussed above, it should be understood that any suitable optical splitter may be used. For example, an optical splitter having a different output power ratio may be used, such as a 90-10 ratio, where 90% of the received test signal optical power is transmitted to DUT 135 and 10% of the received test signal optical power is transmitted to optical launch power monitor and feedback controller 130, or vice-versa.

Consistent with implementations described herein, optical launch power monitor and feedback controller 130 may be configured to receive the split optical test signal from splitter 125, and measure one or more parameters associated with the received signal. For example, optical launch power monitor and feedback controller 130 may measure the optical launch power of the received signal and/or the wavelength of the received signal. As described above, for a 50-50 optical splitter, the measured optical launch power may be multiplied by a factor of two to determine the optical launch power of the signal received by optical splitter 125.

Optical launch power monitor and feedback controller 130 may further be configured to output an indication of the measured optical launch power and/or wavelength to one or more of tunable laser 105, optical amplifier 110, or VOA 115. These indications may be referred to as feedback and may be used adjust the test signal ultimately received by splitter 125, to ensure that it meets with the test expectations.

For example, although tunable laser 105 may be set to output a 1530 nm wavelength signal, optical launch power monitor and feedback controller 130 may measure the wavelength of the received test signal at, for example, 1532 nm. This information may be transmitted to tunable laser 105 and used to fine-tune the output of tunable laser 105 to ensure that the test signal received at optical launch power monitor and feedback controller 130 is at the selected wavelength. Similarly, VOA 115 may be set to output a test signal having an optical power of, for example, 23 dBm; however, optical launch power monitor and feedback controller 130 may measure an optical launch power of 12 dBm (corresponding to an initial test signal optical launch power of 23 dBm, for a 50-50 2×2 splitter). An indication of this measurement may be transmitted from optical launch power monitor and feedback controller 130 to VOA 115 and used to adjust the output of VOA 115 to conform to the test parameters.

As briefly described above, DUT 135 may include any optical component or group of optical components for which a return loss model or function is desired, such as a connector, a connector pair, an optical switches, a length of optical fiber, etc.

Downstream power meter 140 may be configured to receive and measure the optical power in an output signal from DUT 135. In some implementations, downstream power meter 140 may include a photodiode (e.g., a indium-gallium-arsenide (InGaAs) or germanium photoconductor) or other sensor configured to detect the optical power of the signal output from DUT 135 relative to a reference power level. Accordingly, the measured power level represents the insertion loss (IL) associated with DUT 135.

As briefly described above, any portion of the test signal reflected back by DUT 135 represents the RL associated with DUT 135. The reflected optical signal is output by DUT 135 in an upstream direction and enters passive optical splitter 125. For a 50-50 2×2 splitter, a first signal having one half of the optical power of the reflected signal is transmitted toward isolator 120 and second signal having one half of the optical power of the reflected signal is transmitted toward reflection power meter 145.

Reflection power meter 145 may include any RL measuring device configured to measure the RL of a received signal. Upon receipt of the reflected signal, reflection power meter 145 may determine the return loss associated with DUT 135. For example, reflection power meter 145 may include a photodiode sensor and suitable processing logic to correct for losses introduced by optical splitter 125 (e.g., 3 dB for the downstream path and 3 dB for the upstream path). In some implementations, reflection power meter 145 may receive test parameter information from, for example, control processor 160.

Database controller 150 may include processing logic for receiving the measured RL, as well as information relating to the optical launch power and the wavelength of the test signal (e.g., from optical launch power monitor and feedback controller 130). Database controller 150 may be configured to store the calculated RL, the test signal optical launch power, and the test signal wavelength in database 155. In some implementations, storing of these parameters may be made upon receipt of an indication from optical launch power monitor and feedback controller 130 that the test signal meets user-requested characteristics relating to launch power and wavelength.

As described in additional detail below, RL modeling system 100 may be configured to systematically and/or automatically progress through a number of optical launch powers and/or input signal wavelengths with database controller 150 storing information for each respective iteration in database 155. In one implementation, RL modeling system 100 may progress stepwise from a test signal having an approximately −20 dBm launch power to a test signal having an approximately +30 dBm launch power in 0.25 or 0.5 dBm steps. A step size of 0.5 dBm, for example, would include 100 RL measurements/calculations corresponding to 100 entries into database 155.

Figure 2:
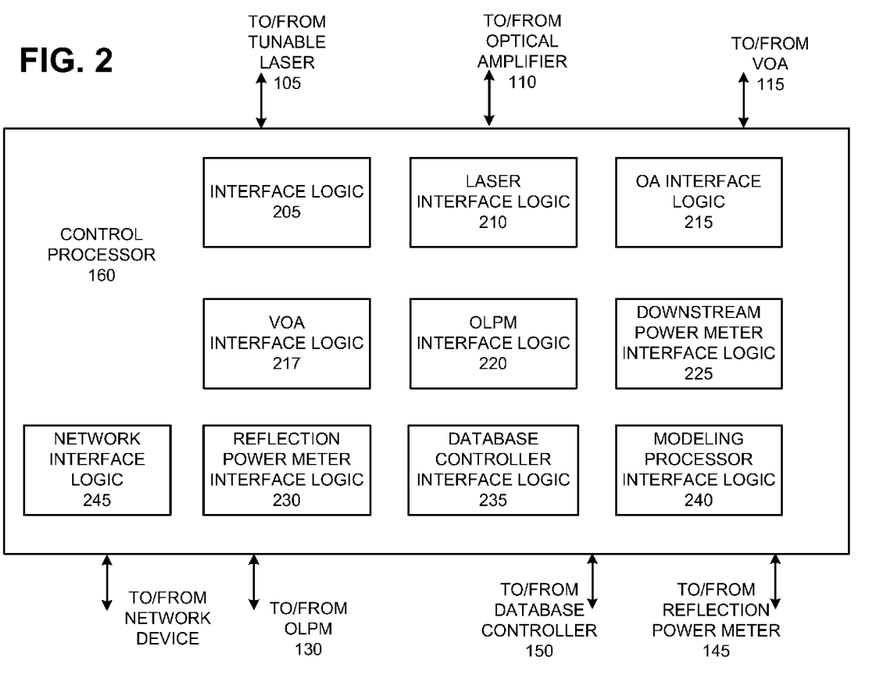
FIG. 2 illustrates exemplary components of the control processor of FIG. 1.

Control processor 160 may include logic to interact with tunable laser 105, optical amplifier 110, VOA 115, optical launch power monitor and feedback controller 130, downstream power meter 140, reflection power meter 145, database controller 150, and modeling processor 165. FIG. 2 illustrates exemplary components of control processor 160. As illustrated, control processor 160 may include interface logic 205, laser interface logic 210, optical amplifier (OA) interface logic 215, VOA interface logic 217, optical launch power monitor interface logic 220, downstream power meter interface logic 225, reflection power meter interface logic 230, database controller interface logic 235, modeling processor interface logic 240, and network interface logic 245.

Control processor 160 may include logic for executing a test. For example, interface logic 205 may receive testing parameters from a user, such as optical power range, input signal wavelength, step size, etc. In some implementations, the testing parameters may be received remotely from control processor 160 via network interface logic 245.

Laser interface logic 210 may be configured to communicate with tunable laser 105 and tune the output of tunable laser 105 to output a test signal to optical amplifier 110. OA interface logic 215 may be configured to communicate with optical amplifier 110 to adjust the amount of boost or amplification applied to the test signal based on settings or configuration information received from the user via interface logic 205. VOA interface logic 217 may be configured to communicate with VOA 115 to adjust the level of attenuation applied to the test signal to conform to test parameters.

Optical launch power monitor (OLPM) interface logic 220 may be configured to communicate with optical launch power monitor and feedback controller 130. For example, control processor 160 may transmit information regarding the received test parameters to optical launch power monitor interface logic 220.

In other implementations, optical launch power monitor interface logic 220 may receive measurement information from optical launch power monitor and feedback controller 130. In this embodiment, optical launch power monitor interface logic 220 may compare the received measurement information to the test parameters, to determine whether the signal received by optical launch power monitor and feedback controller 130 corresponds to those parameters. If not, optical launch power monitor interface logic 220 may communicate adjustments to tunable laser 105, optical amplifier 110, and/or VOA 115 via laser interface logic 210, optical amplifier interface logic 215, and VOA interface logic 217.

Downstream power meter logic 225 may be configured to provide reference signal information to downstream power meter 140 and to receive measured power and/or IL values from downstream power meter 140. The received values may be presented to a user, via, e.g., interface logic 205 or transmitted to a remote device via, e.g., network interface logic 245.

Reflection power meter interface logic 230 may be configured to receive measured RL values from reflection power meter 145. The received values may be presented to a user, via, for example, interface logic 205 or transmitted to a remote device via, for example, network interface logic 245.

Database controller interface logic 235 may be configured to interact with database controller 150 and/or database 155. For example, database controller interface logic 235 may enable control processor 160 to identify and/or present previously stored measurement information to the user via interface logic 205. In other implementations, database controller interface logic 235 may be configured to instruct database controller 150 to store RL measurements in database 155, for example, when the launch power and wavelength measured by optical launch power monitor and feedback controller 130 conform to the test parameters.

Modeling processor interface logic 240 may be configured to interface with modeling processor 165. For example, modeling processor interface logic 240 may enable control processor 160 to identify and/or present previously functions, curves, and/or models associated with prior or current tests to the user via interface logic 205, or to a network device, via network interface logic 245.

Network interface logic 245 may be configured to provide network connectivity to control processor 160 to allow, for example, configuration and use of RL modeling system 100 via a network device remote from control processor 160. Exemplary network interfaces may include Ethernet, 802.11x wireless, etc.

Returning to FIG. 1, modeling processor 165 may include one or more logical components for generating and/or determining a function or curve corresponding to the RL performance of DUT 135 based on the information stored in database 155. For example, modeling processor 165 may plot data corresponding to RL measurements as a function of optical launch power based on the information stored in database 155. Modeling processor 165 may then fit a curve or function to the plotted data points that may be used to predict future RL performance of DUT 135 in different environments. In some implementations, modeling processor 165 may be used to determine functions for a number of components in a passive optical network (PON), this providing a statistical picture of the performance of PON in a variety of circumstances.

As described above, the configuration of RL modeling system 100 in FIG. 1 is exemplary only. It should be understood that RL modeling system 100 may include more or fewer components than illustrated in FIG. 1.

Figure 3:
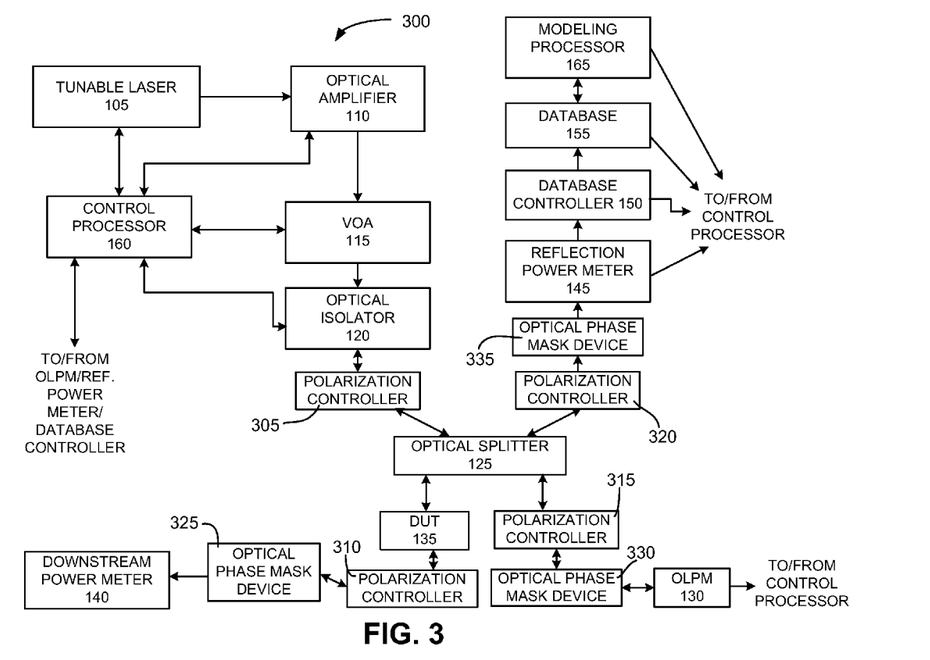
FIG. 3 is a block diagram of illustrating another exemplary RL modeling system consistent with implementations described herein.

FIG. 3 is a block diagram of a portion of another exemplary RL modeling system 300. The same reference numbers in FIG. 3 may identify the same or similar elements as set forth above in FIG. 1. In the embodiment of FIG. 3, system 300 (in addition to components described in detail above) may include one or more polarization controllers and/or optical phase masks for enabling testing of polarization dependent loss (PDL) and/or multipath interference (MPI).

For example, a first polarization controller 305 may be provided after optical isolator 120, a second polarization controller 310 may be provided before downstream power meter 140, a third polarization controller 315 may be provided before reflection power meter 145, and a fourth polarization controller 320 may be provided before OLPM 130. The polarization controllers 305-320 may be tuned to create desired polarization states based on received a polarization of the received test signal. In some instances, measurements may be taken for each of a number of polarization states.

As shown in FIG. 3, RL modeling system 300 may include a first optical phase mask device 325 placed after second polarization controller 310, a second optical phase mask device 330 placed after third polarization controller 315, and a third optical phase mask device 335 placed after fourth polarization controller 320. Optical phase masks 325-335 may be tuned to pass light matching a predetermined intensity pattern for a particular polarization mode (e.g., fundamental and higher order linear polarization modes). By properly synchronizing all the received optical signals with database 155 and control processor 160, accurate PDL and MPI values may be calculated and modeled by, for example, modeling processor 165.

Figure 4:
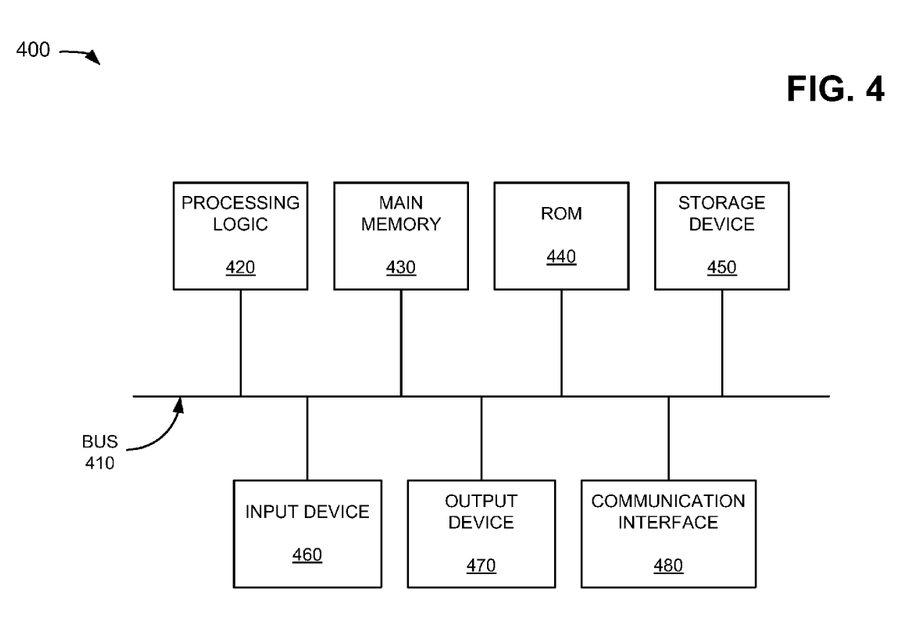
FIG. 4 is an exemplary diagram of a device that may correspond to devices in FIG. 1.

FIG. 4 is an exemplary diagram of a device 400 that may correspond to any of tunable laser 105, optical amplifier 110, VOA 115, OLPM 130, downstream power meter 140, reflection power meter 145, database controller 150, database 155, control processor 160, and/or modeling processor 165 (collectively "devices 105-115, 130, 140, and 145-165"). As illustrated, device 400 may include a bus 410, processing logic 420, a main memory 430, a read-only memory (ROM) 440, a storage device 450, an input device 460, an output device 470, and/or a communication interface 480. Bus 410 may include a path that permits communication among the components of device 400.

Processing logic 420 may include a processor, microprocessor, or other type of processing logic that may interpret and execute instructions. Main memory 430 may include a random access memory (RAM) or another type of dynamic storage device that may store information and instructions for execution by processing logic 420. ROM 440 may include a ROM device or another type of static storage device that may store static information and/or instructions for use by processing logic 420. Storage device 450 may include a magnetic and/or optical recording medium and its corresponding drive.

Input device 460 may include a mechanism that permits an operator to input information to device 400, such as a keyboard, a mouse, a pen, a microphone, voice recognition and/or biometric mechanisms, line-in interface, fiber optical interface, etc. Output device 470 may include an output mechanism, such as a fiber optic interface, a display, a speaker, light emitting diodes (LEDs), etc. Communication interface 480 may include any transceiver-like mechanism that enables device 400 to communicate with other devices and/or systems. For example, communication interface 480 may include mechanisms for communicating with another device or system via a network, such as network 160.

As described herein, device 400 may perform certain operations in response to processing logic 420 executing software instructions contained in a computer-readable medium, such as main memory 430. A computer-readable medium may be defined as a physical or logical memory device. The software instructions may be read into main memory 430 from another computer-readable medium, such as storage device 450, or from another device via communication interface 480. The software instructions contained in main memory 430 may cause processing logic 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer, different, or additional components than depicted in FIG. 4. In still other implementations, one or more components of device 400 may perform one or more other tasks described as being performed by one or more other components of device 400.

Figure 5:
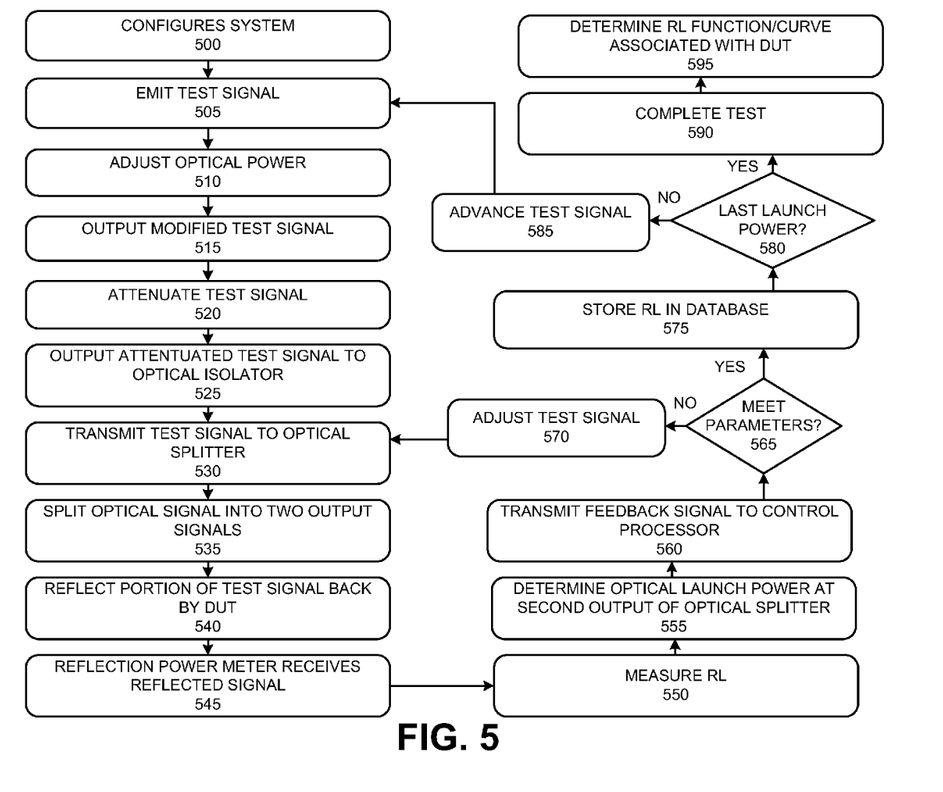
FIG. 5 is a flow diagram illustrating exemplary processing associated with performing return loss measuring/modeling of a device under test consistent with implementations described herein.

FIG. 5 is a flow diagram illustrating exemplary processing associated with performing RL modeling of a DUT consistent with implementations described herein. Processing may begin by a technician configuring RL modeling system 100 (block 500). For example, processing may begin with the technician connecting DUT 135 and selecting a test wavelength, an optical power range, and a step size.

For example, assume that the technician is testing an optical connector with a 1530 nm wavelength test signal, for optical launch powers ranging from −20 dBm to +20 dBm in 0.25 dBm increments. These parameters may be input to RL modeling system 100 via interface logic 205 in control processor 160.

Once the test parameters have been established, a test signal of the selected wavelength may be emitted from tunable laser 105 into optical amplifier 110 (block 505). Optical amplifier 110, in response to instructions from control processor 160 and/or optical launch power monitor and feedback control 130 may adjust the optical power of the test signal (block 510) and may output a modified test signal to VOA 115 (block 515). As discussed briefly above, exemplary optical amplifiers may be configured to boost the optical power of an input signal by up to 25 dBm.

VOA 115 may receive the modified test signal from optical amplifier 110 and adjust the power level of the test signal in a controlled manner based on, e.g., user input via control processor 160 and/or or feedback from optical launch power monitor and feedback controller 130 (block 520). An attenuated test signal may be output to optical isolator 120 (block 525), which, in turn, transmits the test signal to passive optical splitter 125 (block 530).

Optical splitter 125 splits the optical signal into at least two output signals (block 535). As described above, an exemplary optical splitter 125 may include a 50-50 2×2 optical splitter that outputs a signal having 50% of the optical power of the received signal on both outputs.

DUT 135 may receive a first output of optical splitter 125 and may reflect a portion of the received signal back through optical splitter 125 (block 540). For example, backscattering in an optical device may be caused by Bragg diffraction, Rayleigh scattering, Brillouin scattering, Raman scattering, etc.

Reflection power meter 145 may receive the reflected signal (block 545). For example, as described above, the portion of the test signal reflect or backscattered by DUT 135 may return to optical splitter 125 and may be split 50-50, with one signal returning to the optical isolator 120 (and stopping, being absorbed, etc.) and the other signal passing to reflection power meter 145.

Reflection power meter 145 may measure the RL of the received signal and may compensate for splitter-induced losses to generate a RL value associated with optical splitter 125 (e.g., a 3 dB loss induced during each pass through optical splitter 125) (block 550). In some embodiments, reflection power meter 145 may receive test parameter information from control processor 160 and may calculate the RL measurement based on the received test parameters.

Optical launch power monitor and feedback controller 130 receives a second output of the optical splitter and measures the optical launch power for the received signals (block 555). In some implementations, optical launch power monitor and feedback controller 130 may also measure other signal parameters, such as wavelength, etc.

Optical launch power monitor and feedback controller 130 may transmit a feedback signal to, for example, control processor 160 (block 560). The feedback signal may include measurement information corresponding to the measured launch power and/or wavelength of the test signal received by optical launch power monitor and feedback controller 130. Control processor 160 may then determine whether the received measurement information matches the test parameters for the current iteration of the RL measuring test (e.g., the currently tested wavelength and optical launch power) (block 565). For example, control processor 160 may determine whether the received signal has a wavelength that matches the user-selected wavelength and an optical launch power (adjusted for the split signal and known splitter-induced losses) that matches the launch power for the current test.

If not (block 565—NO), control processor 160 may communicate adjustments to tunable laser 105, optical amplifier 110, and/or VOA 115 to bring the measured test signal into line with the user or control provided test parameters (block 570). Processing may then return to block 530 for another measurement of the launch power and/or wavelength of test signal by optical launch power monitor and feedback controller 130.

When it is determined that the test signal received by optical launch power monitor and feedback controller 130 matches the test parameters for the current test iteration (block 565—YES), control processor 160 may transmit a signal to database controller 150, indicating that RL measurement information determined by reflection power meter 145 may be stored in database 155 (block 575).

Once a value for RL has been stored for a particular test iteration, control processor 160 may determine whether the current optical launch power is the last optical launch power (block 580). As described above, the test may be configured to step through a number of optical powers or to advance from a first optical power to a second optical power in predefined step intervals, such as in 0.25 dBm or 0.5 dBm intervals. If it is determined that the current optical launch power is not the last optical launch power (block 580—NO), control processor 160 may advance the test to the next optical launch power (block 585). For example, VOA interface logic 217 may adjust VOA 115 to cause the test signal to have an optical launch power 0.25 dBm greater than the previous test signal. Processing may then return to block 505 for execution of the test at the next optical launch power.

However, when it is determined that the current optical launch power is the last optical launch power (block 580—NO), control processor 160 may complete the test (block 590). Modeling processor 165 may generate and/or determine a function or curve corresponding to the RL performance of DUT 135 based on the RL measurement information stored in database 155 (block 595). For example, modeling processor 165 may plot data points corresponding to RL measurements as a function of optical launch power and wavelength based on the information stored in database 155. Modeling processor 165 may fit a curve or determine a function to the plotted data points that may be used to predict future RL performance of DUT 135 in different environments. For example, as described above, a function may be generated for each optical component in a PON, thereby allowing for accurate modeling of system performance in various operation conditions.

In the manner described above, a model or function of RL measurements associated with a particular DUT may be accurately and quickly determined. This may assist in determining suitability of a particular device or system for a particular implementation based on the statistical modeling of the DUT provided by the described embodiments.

The foregoing description of exemplary implementations provides illustration and description, but is not intended to be exhaustive or to limit the embodiments to the precise form disclosed. Modifications and variations are possible in light of the above teachings or may be acquired from practice of the embodiments. For example, in some implementations, RL measurement information and corresponding statistical functions may be obtained for a number of different wavelengths.

In addition, while series of acts have been described with respect to FIG. 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Further, the phrase "based on" is intended to mean "based, at least in part, on" unless explicitly stated otherwise.

What is claimed is:

1. A method, comprising:
    injecting a test signal having a first optical launch power into a device under test via an optical splitter,
    wherein the optical splitter includes at least two upstream ports and at least two downstream ports,
    wherein the test signal is injected in a first upstream port of the optical splitter, and
    wherein the device under test is coupled to a first one of the at least two downstream ports;
    receiving the test signal at a launch power monitor coupled to a second one of the at least two downstream ports;
    measuring the optical launch power of the test signal by the launch power monitor;
    determining whether the measured optical launch power matches test parameters for the test signal;
    adjusting the injected test signal when the measured optical launch power does not match the test parameters;
    measuring return loss (RL) associated with the device under test at a second upstream input of the optical splitter;
    storing the RL measurement in a database; and
    repeating the injecting, measuring, and storing for a number of different optical launch powers.

2. The method of claim 1, further comprising:
    storing the RL measurement in the database when the measured optical launch power matches the test parameters for the test signal.

3. The method of claim 1, further comprising:
    measuring a wavelength of the test signal;
    determining whether the measured wavelength matches the test parameters for a current test signal iteration;

adjusting the injected test signal when the measured wavelength does not match the test parameters for the current test signal iteration; and storing the RL measurement in the database when the measured wavelength match the test parameters for the test signal.

4. The method of claim 1, wherein measuring RL from the device under test further comprises:

correcting for losses to the test signal caused by the optical splitter.

5. The method of claim 1, further comprising:

generating a curve or function corresponding to the stored RL measurements.

6. The method of claim 1, wherein repeating the injecting, measuring, and storing for different optical launch powers is performed at selected intervals.

7. The method of claim 1, wherein injecting the test signal comprises:

emitting an optical signal from a tunable laser;

amplifying the optical signal to generate an amplified signal; and attenuating the amplified signal to generate the test signal.

8. The method of claim 6, wherein the selected intervals comprise 0.25 or 0.5 dBm optical launch power intervals.

9. The method of claim 7, wherein the tunable laser emits a broadband signal in wavelengths ranging from approximately 1530 nanometers (nm) to approximately 1625 nm.

10. The method of claim 7, wherein attenuating the amplified signal is performed by a variable optical attenuator (VOA).

11. The method of claim 9, wherein amplifying the optical signal is performed by an optical boost amplifier to amplify the optical signal from 0 to 25 decibels (dBm).

12. A return loss measurement system, comprising:

a tunable signal source to emit a test signal on an optical fiber at a selected wavelength;

a variable optical attenuator (VOA) optically coupled to the tunable signal source to attenuate the test signal to a selected optical launch power;

an optical splitter having a first upstream port, a second upstream port, and a downstream port, wherein the first upstream port is optically coupled to the VOA;

a device under test optically coupled to the downstream port of the optical splitter;

a reflection power monitor optically coupled to the second upstream port to measure return loss (RL) associated with the device under test; and logic configured to:

receive test parameters for an RL test, wherein the test parameters include at least the selected wavelength, a range of optical launch powers, and an optical launch power step interval;

adjust the test signal based on the test parameters for a number of different optical launch powers;

instruct the reflection power monitor to measure RL associated with the device under test for each of the number of different optical launch powers; and store the RL measurements in a database.

13. The system of claim 12, further comprising:

an optical amplifier optically coupled to the tunable signal source to amplify the test signal.

14. The system of claim 12, further comprising:

an optical isolator coupled between the VOA and the first upstream port for preventing back reflected signals from entering the VOA.

15. The system of claim 12, further comprising:

a launch power monitor optically coupled to a second downstream port on the optical splitter, wherein the device under test is optically coupled to a first downstream port on the optical splitter, wherein the launch power monitor is configured to measuring the optical launch power of the test signal, and wherein the logic is further configured to:

determine whether the measured optical launch power matches at least one of the test parameters for the test signal, adjust the test signal when the measured optical launch power does not match at least one of the test parameters for the test signal, and store the RL measurement in the database when the measured optical launch power matches at least one of the test parameters for the test signal.

16. The system of claim 12, wherein the optical power launch interval ranges from approximately 0.25 to approximately 0.5 dBm.

17. The system of claim 12, wherein the logic is further configured to:

correct for losses to the test signal caused by the optical splitter before storing the RL measurements in the database.

18. The system of claim 12, wherein the logic is further configured to:

generate a curve or function for the device under test based on the stored RL measurements.

19. The return loss (RL) testing system of claim 12, wherein the logic comprises:

a control processor to execute an RL test.

20. A return loss (RL) testing system, comprising:

a tunable laser to generate a test signal having a selected wavelength;

an optical amplifier optically coupled to an output of the tunable laser to boost the optical power of the test signal;

a variable optical amplifier (VOA) optically coupled to an output of the optical amplifier to regulate the optical power of the test signal based on test parameters;

a optical splitter having first and second upstream ports and first and second downstream ports, wherein the first upstream port is optically coupled to the VOA to receive the attenuated test signal;

a device under test optically coupled to the first downstream port of the optical splitter;

an optical launch power monitor optically coupled to the second downstream port of the optical splitter; and an RL measuring device optically coupled to the second upstream port of the optical splitter, wherein the RL measuring device is configured to receive a portion of the test signal back reflected from the device under test and transmitted through the first downstream port and the second upstream port of the optical splitter and measure RL of the device under test based on the received portion, and wherein the RL measuring device is configured to store the RL measurement.

* * * * *